United States Patent
Wang et al.

(10) Patent No.: US 11,449,187 B2
(45) Date of Patent: Sep. 20, 2022

(54) LOCKSCREEN DISPLAY CONTROL METHOD AND DEVICE, AND STORAGE MEDIUM

(71) Applicant: BEIJING XIAOMI MOBILE SOFTWARE CO., LTD., Beijing (CN)

(72) Inventors: Haoran Wang, Beijing (CN); Jianjiang Qu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 17/128,173

(22) Filed: Dec. 20, 2020

(65) Prior Publication Data
US 2021/0365276 A1 Nov. 25, 2021

(30) Foreign Application Priority Data
May 22, 2020 (CN) .......................... 202010439215.9

(51) Int. Cl.
*G06F 3/0481* (2022.01)
*G06F 9/451* (2018.01)
*G06F 21/36* (2013.01)

(52) U.S. Cl.
CPC ............ *G06F 3/0481* (2013.01); *G06F 9/451* (2018.02); *G06F 21/36* (2013.01)

(58) Field of Classification Search
CPC ..................... G06F 2203/04804; G06F 3/0481
See application file for complete search history.

(56) References Cited

U.S. PATENT DOCUMENTS 10,573,067 B1 * 2/2020 Naik ......................... G06T 7/50
10,748,313 B2 * 8/2020 Holzer ..................... G06T 5/005
2008/0186332 A1 8/2008 Kim
(Continued)

FOREIGN PATENT DOCUMENTS

CN 103019766 A 4/2013
CN 103699398 A 4/2014
(Continued)

OTHER PUBLICATIONS

Shane Conder et al: "Android Wireless Application Development (2nd Edition)", In: Android Wireless Application Development (2nd Edition), Dec. 25, 2010 (Dec. 25, 2010), XP055242283, ISBN: 978-0-321-74301-5, pp. 0-761, p. 69-p. 80, p. 92-p. 103, p. 107-p. 132, p. 161-p. 171, p. 205-p. 230, p. 367-p. 396, p. 407-p. 412, p. 451-p. 469.
(Continued)

*Primary Examiner* — Mong-Shune Chung
(74) *Attorney, Agent, or Firm* — Syncoda LLC; Feng Ma

(57) ABSTRACT

A lockscreen display control method can be applied to an electronic device and include: when the electronic device has a bright screen in a lockscreen state, a transparent lockscreen window is drawn by using a lockscreen service, and a lockscreen wallpaper process is launched; an activity instance of the lockscreen wallpaper process is created, and an attribute of the activity instance is set to be always on top; a device orientation of the electronic device is monitored by using the activity instance to acquire an orientation parameter; and according to the orientation parameter, a wallpaper displayed under the lockscreen window is adjusted, and the wallpaper is controlled to dynamically display under the lockscreen window.

16 Claims, 10 Drawing Sheets

---

When the electronic device has a bright screen in a lockscreen state, a transparent lockscreen window is drawn by using a lockscreen service, and a lockscreen wallpaper process is launched — 101

An activity instance of the lockscreen wallpaper process is created, and an attribute of the activity instance is set to be always on top — 102

A device orientation of the electronic device is monitored by using the activity instance to acquire an orientation parameter — 103

According to the orientation parameter, a wallpaper displayed under the lockscreen window is adjusted, and the wallpaper is controlled to dynamically display under the lockscreen window — 104

(56) References Cited

U.S. PATENT DOCUMENTS

| | | | | |
|---|---|---|---|---|
| 2013/0212702 A1* | 8/2013 | Niglio | ............... | G06F 21/36 726/28 |
| 2014/0184471 A1 | 7/2014 | Martynov | | |
| 2015/0089636 A1 | 3/2015 | Martynov et al. | | |
| 2015/0138243 A1* | 5/2015 | Lin | ............... | H04M 1/724 345/659 |
| 2015/0213252 A1* | 7/2015 | Wilairat | ............... | G06F 21/36 726/17 |
| 2015/0254464 A1* | 9/2015 | Shah | ............... | G06F 21/31 726/18 |
| 2015/0334219 A1* | 11/2015 | Soundararajan | .. | H04M 1/72403 455/414.1 |
| 2017/0115998 A1* | 4/2017 | Fang | ............... | H04M 1/72448 |
| 2017/0262390 A1* | 9/2017 | Noro | ............... | G06F 13/18 |
| 2019/0096139 A1 | 3/2019 | Chu | | |
| 2020/0244940 A1 | 7/2020 | Li et al. | | |
| 2020/0264826 A1* | 8/2020 | Kwon | ............... | G06F 1/1681 |

FOREIGN PATENT DOCUMENTS

| | | | |
|---|---|---|---|
| CN | 104427087 A | 3/2015 | |
| CN | 106648650 A | 5/2017 | |
| CN | 108717369 A | 10/2018 | |
| CN | 109672776 A * | 4/2019 | ............ H04M 1/725 |
| CN | 109672776 A | 4/2019 | |
| CN | 110990090 A | 4/2020 | |

OTHER PUBLICATIONS

European Search Report in the European application No. 20217088.2, dated Jun. 15, 2021.

First Office Action of the Chinese application No. 202010439215.9, dated Jul. 3, 2020.

Notice of Allowance of the Chinese application No. 202010439215.9, dated Jul. 27, 2020.

* cited by examiner

LOCKSCREEN DISPLAY CONTROL METHOD AND DEVICE, AND STORAGE MEDIUM

CROSS-REFERENCE TO RELATED APPLICATION

This application claims priority to Chinese Patent Application No. 202010439215.9 filed on May 22, 2020, the disclosure of which is hereby incorporated by reference in its entirely.

BACKGROUND

Smartphones have become essential tools of modern people in life, entertainment and work. After years' of development, an android system is derived with increasingly rich functions as an operation system of the smartphone, which not only solves requirements of users in different scenarios, but also optimizes use experiences of the users in a better interactive form.

SUMMARY

The present disclosure relates generally to the technical field of android development, and more specifically to a lockscreen display control method and device, and a storage medium.

According to a first aspect of the embodiments of the present disclosure, a lockscreen display control method is provided, which may be applied to an electronic device, and may include: responsive to that the electronic device has a bright screen in a lockscreen state, a transparent lockscreen window is drawn by using a lockscreen service, and a lockscreen wallpaper process is launched; an activity instance of the lockscreen wallpaper process is created, and an attribute of the activity instance is set to be always on top; a device orientation of the electronic device is monitored by using the activity instance to acquire an orientation parameter; and according to the orientation parameter, a wallpaper displayed under the lockscreen window is adjusted, and the wallpaper is controlled to dynamically display under the lockscreen window.

According to a second aspect of the embodiments of the present disclosure, a lockscreen display control device is provided, which may include: a processor; and a memory configured to store instructions executable by the processor. The processor is configured to execute the executable instructions stored in the memory to implement any method in the first aspect.

According to a third aspect of the embodiments of the present disclosure, a non-transitory computer-readable storage medium is provided; and when instructions in the storage medium are executed by a processor of a lockscreen display control device, to cause the lockscreen display control device to execute any method in the first aspect.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
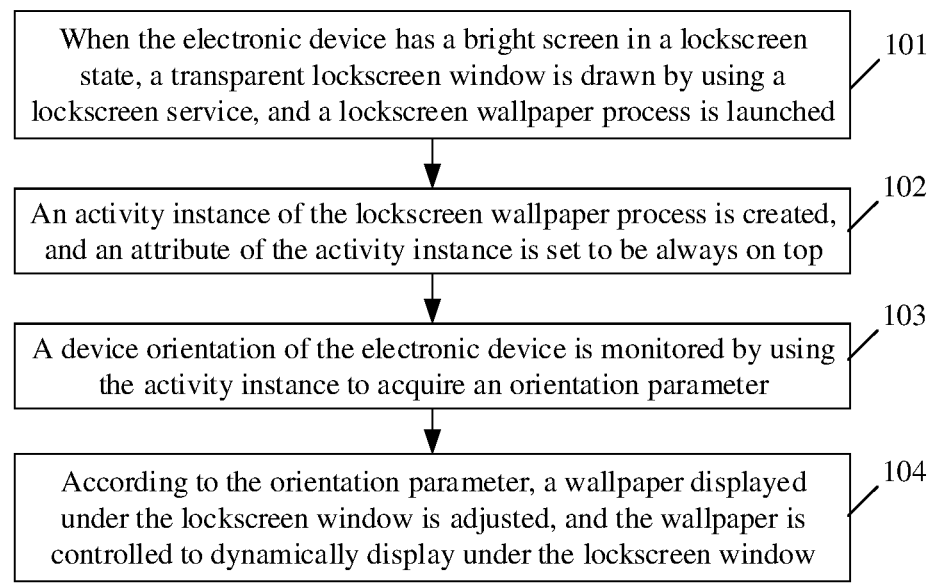
FIG. 1 is a first flowchart showing a lockscreen display control method according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

It is common to lock a screen when the smartphone is not being used. However, after the screen of the smartphone is locked, typically only a set static or dynamic wallpaper can be displayed on the locked screen, and only a single operation such as advancement or back-off can be executed on the wallpaper, such that the display effect and interactivity of the wallpaper when the screen is locked are limited.

In order to enrich lockscreen wallpapers and improve interactivity of the lockscreen wallpapers, an embodiment of the present disclosure provides a lockscreen display control method. FIG. 1 is a first flowchart showing a lockscreen display control method according to some embodiments of the present disclosure. As illustrated in FIG. 1, the method may be applied to an electronic device, and may include the following operations.

At 101, when the electronic device has a bright screen in a lockscreen state, a transparent lockscreen window is drawn by using a lockscreen service, and a lockscreen wallpaper process is launched.

At 102, an activity component instance (or called activity instance) of the lockscreen wallpaper process is created, and an attribute of the activity instance is set to be always on top.

At 103, a device orientation of the electronic device is monitored by using the activity instance to acquire an orientation parameter.

At 104, according to the orientation parameter, a wallpaper displayed under the lockscreen window is adjusted, and the wallpaper is controlled to dynamically display under the lockscreen window.

It is to be noted that the electronic device refers to any electronic device having a display screen and capable of executing a lockscreen operation, such as a smartphone, a tablet computer, a smartwatch or the like.

Herein, the lockscreen of the electronic device is bound with the screen off, that is, when the lockscreen operation is executed on the electronic device, the display screen of the electronic device is turned off and becomes a black screen. The execution of the lockscreen operation includes: a power key is touched for execution, a lockscreen key of a shortcut button region in a pull-down notification bar is clicked for execution, or a fixed period is set to execute automatic lockscreen (for example, the lockscreen is automatically executed once every 20 min), or the lockscreen operation is executed based on a voice lockscreen instruction.

At 101, the bright screen in the lockscreen state refers to a state in which the electronic device is located in the lockscreen state, but the display screen of the electronic device is triggered to change from the black screen to the bright screen. The operation that the display screen is triggered may include: the display screen is triggered based on a touch operation of a user, or, the display screen is automatically triggered based on a fixed period (for example, the display screen becomes bright once every 10 s in the lockscreen state).

In some embodiments of the present disclosure, the lockscreen service is a service for executing the lockscreen operation. The lockscreen operation includes: a lockscreen window is drawn and an unlock window is drawn. The lockscreen window is a window triggered and displayed after the screen is locked, which includes: time, a date, a lockscreen identifier and/or a lockscreen wallpaper and other information. The unlock window is a window for inputting an unlock password, which includes: multiple numeral keys and/or multiple symbol keys.

In some embodiments of the present disclosure, the transparent lockscreen window is drawn by using the lockscreen service to display the wallpaper, such that the user may see the wallpaper displayed under the transparent lockscreen window. Herein, the lockscreen window may control its transparency by setting image transparency.

The lockscreen wallpaper process is a process set for implementing higher interactivity of the lockscreen wallpaper in some embodiments of the present disclosure. The lockscreen wallpaper process is launched when the electronic device has the bright screen in the lockscreen state. By means of the lockscreen wallpaper process, the electronic device may display the wallpaper having a better operability after the screen is locked. It is to be noted that the lockscreen wallpaper process is set in a system service, is launched by the lockscreen service when the electronic device has the bright screen in the lockscreen state, and is ended after the electronic device is unlocked. The lockscreen wallpaper process does not pertain to a visible application program in the electronic device.

In some embodiments of the present disclosure, after the lockscreen wallpaper process is launched, an activity instance of the lockscreen wallpaper process is created, and an attribute of the activity instance is set to be always on top. Herein, after being created, the activity instance of the lockscreen wallpaper process is located under the lockscreen window drawn by using the lockscreen service. When the lockscreen window is set to be transparent, the wallpaper displayed by the activity instance may be showed to the user through the transparent window.

The activity instance includes a user interface (UI) configured to interact with the user. The attribute of the activity instance is set to be always on top, which is intended to make the activity instance in an activated state all the time, i.e., the device orientation of the electronic device can be monitored continuously, and the life cycle of the activity instance is not affected by other newly launched application programs. For example, the life cycle of the activity instance is ended, such that no process monitoring gyroscope and the like in the operation system layer detect the orientation parameter reported by an orientation sensor that detects the orientation parameter of the electronic device.

The device orientation of the electronic device reflects the placement orientation of the electronic device, and may be collected by the orientation sensor in the electronic device. The orientation sensor includes: a gyroscope or a three-axis acceleration sensor.

Figure 2:
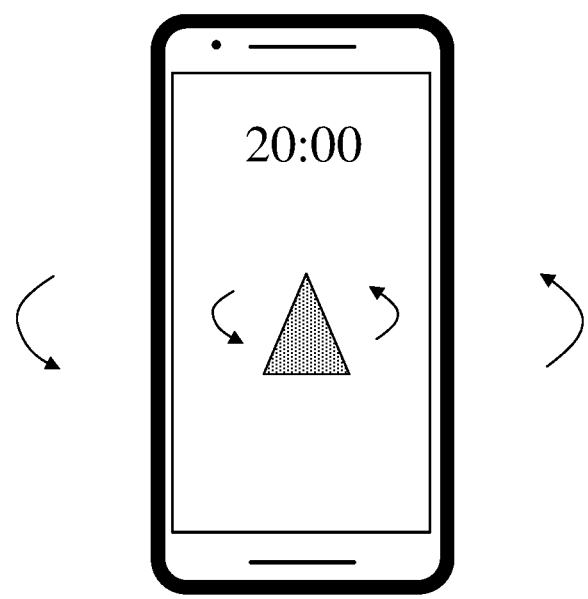
FIG. 2 is a schematic diagram of a switch relationship between an electronic device and a wallpaper.

In order to better utilize the interaction effect, in some embodiments of the present disclosure, the activity instance is used to monitor the device orientation of the electronic device to obtain the current orientation parameter of the electronic device, thereby adjusting the wallpaper displayed under the transparent lockscreen window according to the orientation parameter, and displaying the wallpaper under the transparent lockscreen window. That is, as illustrated in FIG. 2 which is a schematic diagram of a switch relationship between an electronic device and a wallpaper, the corresponding lockscreen wallpaper may be set and displayed according to the monitored device orientation to enrich the display effect of the lockscreen wallpaper. As illustrated in FIG. 2, when the electronic device rotates left and right, the wallpaper displayed in the lockscreen state is switched.

The lockscreen wallpaper displayed when the screen is locked changes with the change of the device orientation. Herein, the change of the wallpaper includes: a change of a wallpaper content, i.e., the wallpaper content changes into a content relevant to the current orientation parameter; or, the wallpaper content does not change but the display effect changes. For example, the wallpaper content is a 3D person model, and with the change of the device orientation, the wallpaper content is still the 3D person model but the displayed lighting effect of the 3D person model changes.

The orientation parameter is configured to reflect the placement orientation of the electronic device, and may be represented by an orientation of the display screen on a body of the electronic device, and an included angle between the body of the electronic device and the ground. For example, the orientation parameter may be that the display screen of the electronic device faces towards the south and an included angle of 45° is formed between the body and the ground.

Herein, when it is determined that the orientation parameter changes, the wallpaper displayed under the lockscreen window is adjusted once correspondingly, so as to implement dynamic display of the wallpaper under the lockscreen window. The operation that the wallpaper is controlled to dynamically display under the lockscreen window may include: based on the orientation parameter, the wallpaper is controlled to dynamically display under the lockscreen window by adjusting the wallpaper displayed under the lockscreen window. Since the displayed wallpaper is adjusted with the orientation parameter, the dynamic display effect of the wallpaper may be implemented.

As an example, when the user picks up the electronic device in the lockscreen state, and touches the display screen to trigger the bright screen of the electronic device, the wallpaper A is displayed under the lockscreen window; if the user turns over the electronic device once at this time, the electronic device changes an included angle of 10° between the body and the ground into an included angle of 60° between the body and the ground. Now, due to the change of the orientation, the wallpaper under the lockscreen window changes from the wallpaper A to the wallpaper B. Herein, the wallpaper A corresponds to the orientation in which the body of the electronic device forms the included angle of 10° with the ground, and the wallpaper B corresponds to the orientation in which the body of the electronic device forms the included angle of 60° with the ground.

The corresponding relationship between the orientation parameter of the electronic device and the wallpaper displayed under the lockscreen window may include: one orientation parameter corresponds to one wallpaper, and may further include: when a change greater than an angle threshold occurs, one wallpaper is corresponded.

For the case where one orientation parameter corresponds to one wallpaper: the orientation parameter is detected by the orientation sensor, and the orientation sensors having different types or provided by different manufacturers vary in precision, such that when the orientation has a small change, the wallpaper is not switched. For example, when the included angle of 45° between the body and the ground changes into an included angle of 40° between the body and the ground, some orientation sensors may detect two orientation parameters but some orientation sensors may still detect one orientation parameter. Therefore, in some embodiments of the present disclosure, whether the orientation parameters belong to the same orientation parameter is determined by comparing data detected by the orientation sensor in two times, thereby determining whether to switch the wallpaper.

For the case where the angle change greater than the threshold occurs, one wallpaper is corresponded: when a mobile terminal is used, the mobile terminal has many small orientation changes and some changes are only unconscious movements of the user; however, the small action each time will switch the wallpaper, which not only increases the system consumption but also bring poor user experience. In view of this, various embodiments of the present disclosure provide that the change greater than the angle threshold corresponds to one wallpaper. The angle threshold may be determined according to a use habit of the user, for example, the threshold may be set as 45°, i.e., the mobile phone is picked up from a table, and the change of the included angle between the body of the mobile phone and the ground is the change greater than 45°.

According to some embodiments of the present disclosure, when the electronic device has the bright screen in the lockscreen state, the transparent lockscreen window is drawn by using the lockscreen service, and the lockscreen wallpaper process is launched. Then, the activity instance of the lockscreen wallpaper process is created, and the attribute of the activity instance is set to be always on top. Next, the device orientation of the electronic device is monitored by using the activity instance to acquire the orientation parameter; and thus, according to the orientation parameter, the wallpaper displayed under the transparent lockscreen window is adjusted. In this way, a wallpaper to be displayed is selected by monitoring the device orientation of the electronic device. Therefore, the wallpaper displayed in the lockscreen state changes according to the change of the device orientation, such that the interactivity of the wallpaper is enhanced, and while the lockscreen effect is enriched and diversified, the user experience is also strengthened.

In some embodiments, the method may further include the following operation.

At 106, before the electronic device enters the lockscreen state, an application parameter of the lockscreen wallpaper process is configured as a call parameter of a keyguard view mediator of the lockscreen service.

The keyguard view mediator of the lockscreen service is to execute a class of a mediation function, and process a state change of the lockscreen service in the identity of a mediator. The keyguard view mediator executes a power management request, a window management notification request and other requests, and is called back by other classes of the lockscreen service as a callback object. For example, the keyguard view mediator may launch to draw the lockscreen after the lockscreen service sends a lockscreen task, i.e., to draw the lockscreen window including the lockscreen wallpaper.

The application parameter of the lockscreen wallpaper process includes: a package name, an application identifier and/or a storage path. The lockscreen wallpaper process may be searched through the application parameter.

The call parameter of the keyguard view mediator refers to: a parameter required when the application program is called, and includes: a package name, an application identifier and/or a storage address of the called application program. For example, in some embodiments of the present disclosure, when the lockscreen wallpaper process is called (i.e., the lockscreen wallpaper process is launched), it is necessary to obtain the application parameter of the lockscreen wallpaper process. Configuring the application parameter of the lockscreen wallpaper process as the call parameter of the keyguard view mediator of the lockscreen service is to make a preparation for subsequently launching the lockscreen wallpaper process, such that when it is detected that the electronic device has the bright screen in the lockscreen state, the lockscreen wallpaper process may be directly launched through the call parameter.

The storage address includes: a full pathname of a class where a main activity instance of the called application program is located, or, a storage address of a file package of the called application program. The main activity instance may reflect the storage path of the application program, and is configured to find the called application program.

In some embodiments of the present disclosure, when the electronic device has the bright screen in the lockscreen state, in order to normally launch the lockscreen wallpaper process, it is necessary to configure the application parameter of the lockscreen wallpaper process to be launched as the call parameter of the keyguard view mediator of the lockscreen service before launching it. As a consequence, when it is detected that the electronic device has the bright screen in the lockscreen state, the lockscreen wallpaper process may be launched, thereby monitoring the device orientation of the electronic device by creating the activity instance, and switching the lockscreen wallpaper according to the orientation of the electronic device in some embodiments of the present disclosure.

Figure 3:
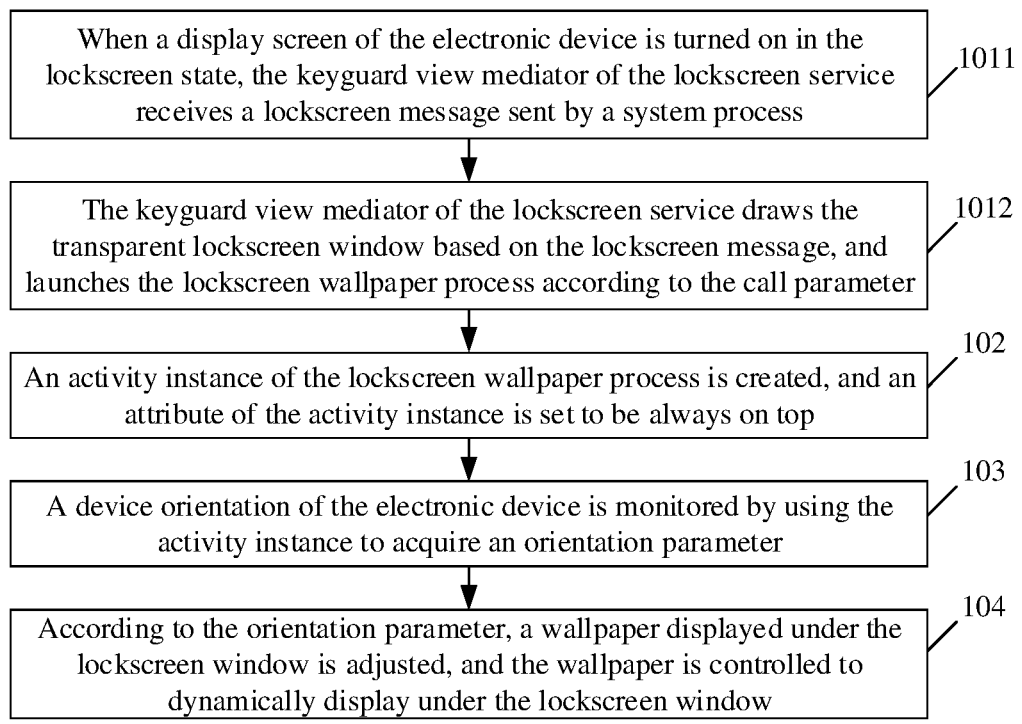
FIG. 3 is a second flowchart showing a lockscreen display control method according to some embodiments of the present disclosure.

Furthermore, based on the operation 106, FIG. 3 is a second flowchart showing a lockscreen display control method according to some embodiments of the present disclosure. As illustrated in FIG. 3, the operation 101 that when the electronic device has the bright screen in the lockscreen state, the transparent lockscreen window is drawn by using the lockscreen service, and the lockscreen wallpaper process is launched may include the following operations.

At 1011, when a display screen of the electronic device is turned on in the lockscreen state, the keyguard view mediator of the lockscreen service receives a lockscreen message sent by a system process.

At 1012, the keyguard view mediator of the lockscreen service draws the transparent lockscreen window based on the lockscreen message, and launches the lockscreen wallpaper process according to the call parameter.

Herein, when the electronic device has the bright screen in the lockscreen state, it is necessary to launch the lockscreen wallpaper process to monitor the device orientation of the electronic device, such that the lockscreen wallpaper can be switched according to the device orientation of the electronic device. In some embodiments of the present disclosure, the keyguard view mediator of the lockscreen service receives the lockscreen message sent by the system process, draws the lockscreen window, and launches the lockscreen wallpaper process.

The system process (or called system service) is configured to control the whole unlocking processing. That is, when it is detected that the electronic device has the bright screen in the lockscreen state, for this case, the system process sends the lockscreen message to the lockscreen system process. Now, the keyguard view mediator responsible for sending the lockscreen message in the lockscreen service receives the lockscreen message, and draws the lockscreen window based on the lockscreen message. Herein, the keyguard view mediator draws the transparent lockscreen window according to the received lockscreen message.

It is to be noted that the lockscreen system process may be customized independently based on the operation system. For example, the lockscreen system process may be a lockscreen system customized based on a system UI, and is configured for the operations of the lockscreen, notification bar and the like.

Furthermore, after the application parameter of the lockscreen wallpaper process is configured as the call parameter of the keyguard view mediator of the lockscreen service, the keyguard view mediator of the lockscreen service may launch the lockscreen wallpaper process according to the call parameter. Consequently, as the mediator, the keyguard view mediator may draw the transparent lockscreen window and launch the lockscreen wallpaper process according to the received lockscreen message sent by the system process, thereby realizing subsequently monitoring the device orientation by using the activity instance of the lockscreen wallpaper process.

In some embodiments, the operation 1012 that the lockscreen wallpaper process is launched according to the call parameter may include: the lockscreen wallpaper process is called and launched through an intent component (or called intent) according to an application identifier of the lockscreen wallpaper process in the call parameter.

The call parameter is a parameter required when the application program is called, and includes: a package name, an application identifier and/or a storage address of the called application program. The application identifier of the application program is configured to represent the application program. Each application program should be unique. Through the application identifier, the application program to be searched may be determined.

The intent is configured to implement interaction and communication between the application programs. When the interaction is needed, the keyguard view mediator transmits call information to the intent, and then the lockscreen wallpaper process is launched by the intent.

Hence, the keyguard view mediator may launches the lockscreen wallpaper process by means of transmitting the application identifier of the lockscreen wallpaper process to the intent.

In some embodiments, the operation 102 that the activity instance of the lockscreen wallpaper process is created, and the attribute of the activity instance is set to be always on top may include the following operations.

At 1021, according to path information of a class where an activity component (or called activity) of the lockscreen wallpaper process is located in the call parameter, a corresponding class of the activity is read, and the activity instance is created according to the read class.

At 1022, when it is determined according to a launch mode of the corresponding class of the activity that the activity instance is located in a stack, the activity instance of the lockscreen wallpaper process is placed on a top of the stack.

At 1023, the attribute of the activity instance is set to be always on top.

The path information of the class where the activity is located is configured to search and read the corresponding class of the activity, and create, after the corresponding class is found, the activity instance according to the read class. The created activity instance inherits a part or all of attributes of the class where the activity is located.

In some embodiments of the present disclosure, the activity has a corresponding launch mode before being launched. The launch mode may be specified by a tag android:launchMode attribute in the configuration file AndroidMainfest.xml. Whether the activity instance is located in the stack may be implemented by reading the launch mode of the corresponding class of the activity.

When it is determined that the activity instance is located in the stack by reading the launch mode, in order to continuously monitor the device state of the electronic device by the activity instance, the activity instance of the lockscreen wallpaper process is placed on the top of the stack in some embodiments of the present disclosure. Placing the activity instance of the lockscreen wallpaper process on the top of the stack may prevent the activity instance of the lockscreen wallpaper process from being affected by activities of other application programs, and prevent the interruption of the monitoring on the device state of the electronic device.

For the instack operation of the activity, when a new activity is launched, the participation and assistance of an activity manager service (AMS) are necessary. As the system service, the AMS may set stack information according to the launch mode of the activity.

It is to be noted that, for the purpose of making more activities work cooperatively without mess, a stack mechanism is provided to manage the activities. With a first-in last-out principle of the stack, the operation system may always display the activity on the top of the stack, and thus the activity located on the top of the stack is the activity turned on at last. When the lockscreen function is executed, the application program running on the electronic device stops to run, and the activity of the application program run at last on the electronic device is pushed onto the stack.

Therefore, when the screen is locked, the activity of the application program run at last is located on the top of the stack.

Nevertheless, in some embodiments of the present disclosure, in order to enrich the lockscreen effect, after the screen is locked, the activity instance of the lockscreen wallpaper process is pushed onto the stack. Now, since the electronic device is in the lockscreen state and no new activity is generated in the electronic device, the activity instance of the lockscreen wallpaper process is located on the top of the stack; and when the electronic device is in the lockscreen state, the activity instance of the lockscreen wallpaper process may be located on the top of the stack all the time.

Herein, in order to reduce the influences from the activities of the other application programs, the attribute of the activity instance of the lockscreen wallpaper process is set to be always on top in some embodiments of the present disclosure, such that the activity instance of the lockscreen wallpaper process may be always on top of the stack when the electronic device has the bright screen in the lockscreen state, thereby ensuring that the device state of the electronic device may be monitored continuously.

In addition, because the activity instance of the application program running at the foreground exists in the stack before the screen is locked, after the wallpaper is switched once through the activity instance of the lockscreen wallpaper process, a completely identical instance is newly created and the attribute is set to be always on top. Compared with a case where the attribute is set to be single on top, the activity instance of the application program running at the foreground before the screen is locked may be maintained in the stack, and the convenience is provided to go back to the application interface of the application program running at the foreground previously after the screen is restored and unlocked.

Figure 4:
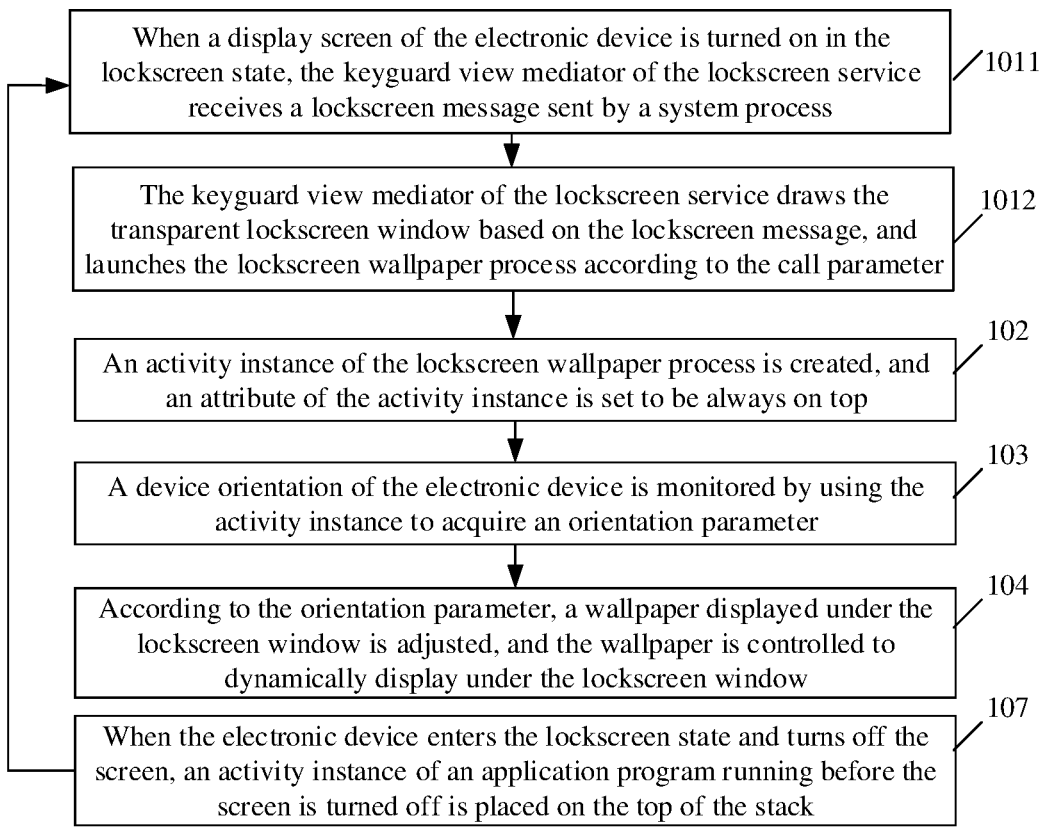
FIG. 4 is a third flowchart showing a lockscreen display control method according to some embodiments of the present disclosure.

FIG. 4 is a third flowchart showing a lockscreen display control method according to some embodiments of the present disclosure. As illustrated in FIG. 4, the method can further include the following operations.

At 107, when the electronic device enters the lockscreen state and turns off the screen, an activity instance of an application program running before the screen is turned off is placed on the top of the stack.

Herein, since a new activity is launched, the participation and assistance of the AMS are required. For the purpose of making more activities work cooperatively without mess, the stack mechanism is provided to manage the activities. When the electronic device enters the lockscreen state and turns off the screen, the activity instance of the application program running before the screen is turned off is placed into the stack. Considering that the activity instance runs at last on the electronic device, it is automatically located on the top of the stack.

Furthermore, on the basis of the instack operation, the operation 1022 that the activity instance of the lockscreen wallpaper process is placed on the top of the stack may include: the activity instance of the application program running before the screen is turned off is moved to a tail of the stack, and the activity instance of the lockscreen wallpaper process is pushed onto the top of the stack.

In order to continuously monitor the device state of the electronic device by the activity instance of the lockscreen wallpaper process, the activity instance needs to be placed on the top of the stack after put into the stack. At this time, the instack operation in the operation 1022 is to move the activity instance of the application program running before the screen is turned off to the tail of the stack, and push the activity instance of the lockscreen wallpaper process onto the top of the stack.

Thereby, by moving the activity instance of the application program running before the screen is turned off to the tail of the stack, the activity instance of the lockscreen wallpaper process may be located on the top of the stack all the time in the lockscreen state of the electronic device, which is beneficial to subsequently monitor the device state of the electronic device.

Figure 5:
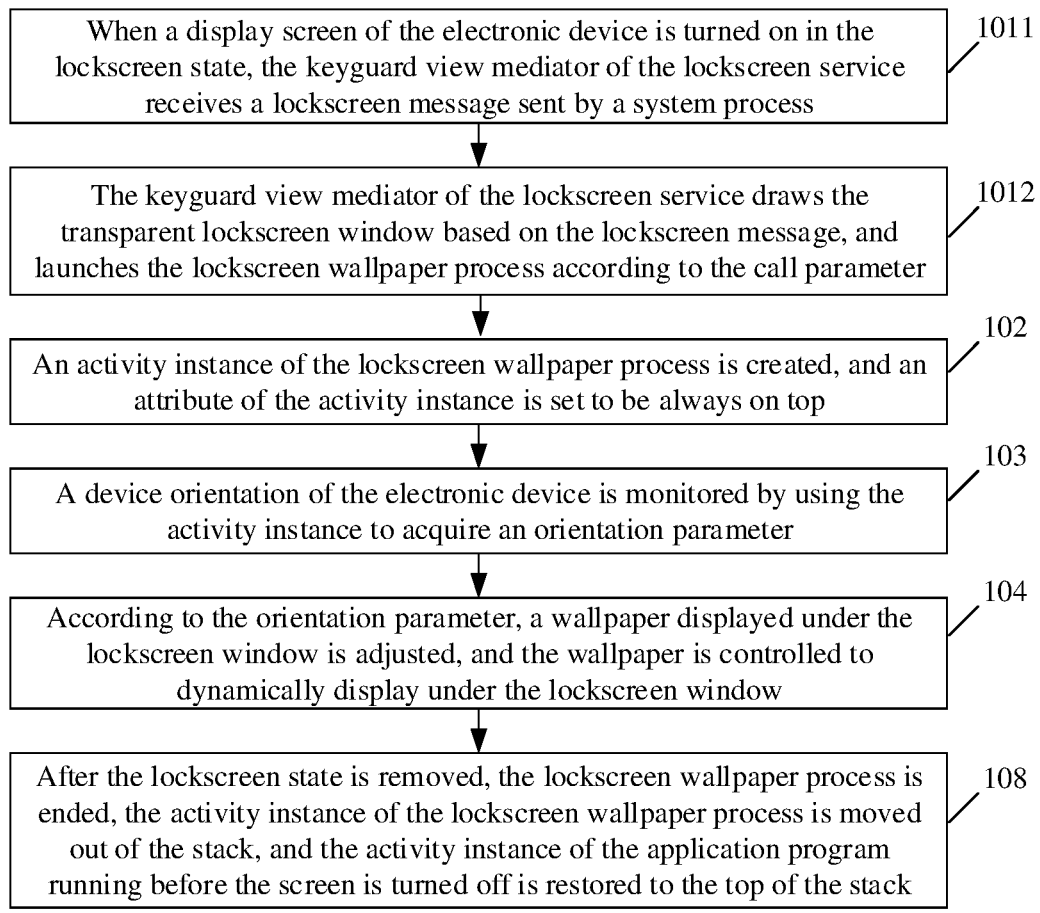
FIG. 5 is a fourth flowchart showing a lockscreen display control method according to some embodiments of the present disclosure.

In some embodiments, FIG. 5 is a third flowchart showing a lockscreen display control method according to some embodiments of the present disclosure. As illustrated in FIG. 5, the method may further include the following operation.

At 108, after the lockscreen state is removed/released, the lockscreen wallpaper process is ended, the activity instance of the lockscreen wallpaper process is moved out of the stack, and the activity instance of the application program running before the screen is turned off is restored to the top of the stack.

Herein, the embodiment of the present disclosure is to enrich the display effect of the lockscreen wallpaper, i.e., the wallpaper display when the electronic device is in the lockscreen state. The lockscreen wallpaper is only displayed when the display screen of the electronic device is in the lockscreen state, such that after the lockscreen state of the electronic device is removed, the lockscreen wallpaper is displayed unnecessarily, and the lockscreen wallpaper process may be ended to reduce the system power consumption. Correspondingly, since the device state of the electronic device is also monitored unnecessarily after the lockscreen state is removed, the activity instance of the lockscreen wallpaper process may be moved out of the stack to normally restore the cooperative work among the activities.

After the activity instance of the lockscreen wallpaper process is moved out of the stack, the activity instance of the application program running at last before the screen is turned off is located on the top of the stack, and the operations of activities of various applications on the electronic device may be restored normally.

In some embodiments, the operation 104 that according to the orientation parameter, the wallpaper displayed under the lockscreen window is adjusted may include the following operation.

At 1041, according to the orientation parameter, the wallpaper displayed under the lockscreen window is selected from multiple alternative images corresponding to different device orientations.

Or, at 1042, a 3D spatial model including the electronic device is acquired, and the 3D spatial model is projected according to the orientation parameter and a relative position relationship between the 3D spatial model and a virtual viewpoint to generate the wallpaper displayed under the lockscreen window.

Herein, the alternative image refers to: the lockscreen wallpaper corresponding to the device orientation and displayed in the lockscreen.

In some embodiments of the present disclosure, since the manner that the wallpaper displayed in the lockscreen state changes according to the change of the device orientation to enhance the interactivity of the wallpaper is proposed, each device orientation corresponds to one alternative image; and thus, whenever the electronic device changes the device orientation, one wallpaper may be switched correspondingly to realize the more abundant display effect. For example, when the orientation parameter is that the display screen of the electronic device faces towards the south and the body forms an included angle of 45° with the ground, the corresponding alternative image may be the wallpaper A. When the orientation parameter is that the display screen of the electronic device faces towards the north and the body forms the included angle of 45° with the ground, the corresponding alternative image may be the wallpaper B.

The wallpaper displayed under the lockscreen window refers to the wallpaper matching the device orientation in the multiple alternative images. Herein, different wallpapers are configured to simulate different images obtained by collecting a same collection object under same illumination environment at different device orientations of the electronic device, that is, since the device orientation of the electronic device changes when the electronic device collects a certain collection object, the amount of light entering a collection apparatus of the electronic device varies from each other, and this is also a case for the lighting effect of the displayed image. In order to intuitively see the lighting effects of images of the same collection object under the same illumination environment at the different device orientations of the electronic device, the images may be simulated through the wallpapers.

Figure 6:
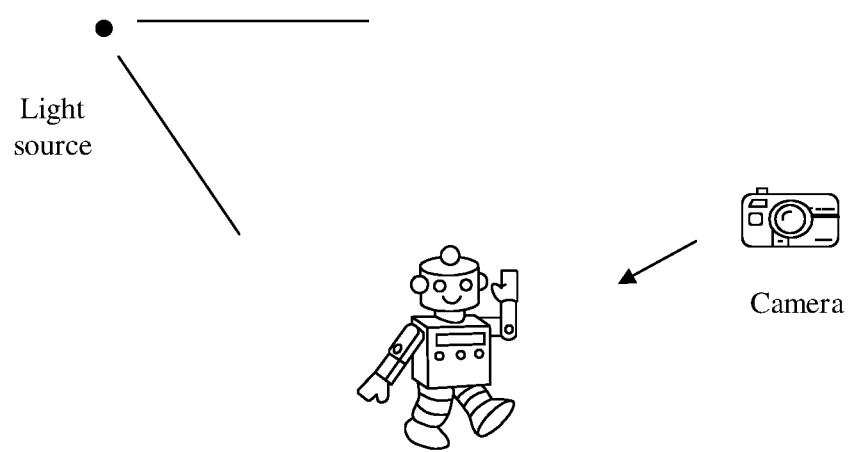
FIG. 6 is a schematic diagram of an application in which a light source is irradiated to a person model for collection.

FIG. 6 is a schematic diagram of an application in which a light source is irradiated to a person model for collection. As illustrated in FIG. 6, the person model shows different lighting effects from different angles. Consequently, the different lighting effects may be obtained at the different angles. In some embodiments of the present disclosure, in order to intuitively see corresponding lighting effect when the electronic device switches different device orientations, while the device orientation of the electronic device changes, a 3D spatial model may be used cooperatively, and the 3D spatial model may be projected according to a relative position relationship between the 3D spatial model and a virtual viewpoint to generate the wallpaper displayed under the transparent lockscreen window.

The 3D spatial model is a model implemented based on reflection of light rays, and includes: a Phong illumination model, or, a blinn-phong based illumination model, configured to reflect the lighting effect generated by the light irradiated on an object.

The 3D spatial model includes three regions: a highlight region, a diffuse reflection region and an ambient light region. The object has a color because when the light is irradiated onto the surface of the object, the object absorbs a part of energy and reflects the rest energy, and the reflected energy becomes the color of the object in human eyes. Hence, to reflect the color of the object, there is a need to reflect the light rays. The effects that the three regions on the 3D spatial model reflect the light may be respectively referred to as: a highlight effect, a diffuse reflection effect and an ambient light effect. Therefore, each lighting effect showed by the collection object is obtained in combination with the highlight effect, the diffuse reflection effect and the ambient light effect, that is, Lighting effect L=La+Ld+Ls.

The La is the ambient light effect, the Ld is the diffuse reflection effect, and the Ls is the highlight effect. The final lighting effect is implemented by overlapping the three light effects.

Figure 7:
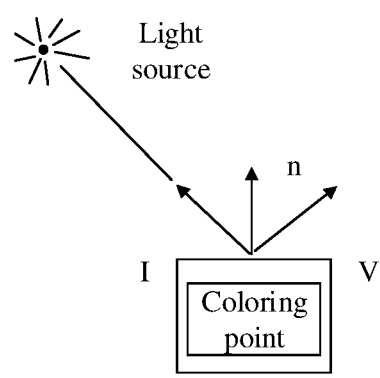
FIG. 7 is a first schematic diagram of light reflection in a 3D spatial model.

FIG. 7 is a first schematic diagram of light reflection in a 3D spatial model. As illustrated in FIG. 7, the point where the light rays are irradiated onto the surface of the object in the 3D spatial model is denoted as a coloring point, n is a normal perpendicular to the surface of the object, I denotes a vector in a light incidence direction, and V is a vector in an observation direction of an observer. When the observation direction gets close to a specular reflection direction, highlight may be observed. When the observation direction gets close to the reflection direction, the n, the I and the V are also close in an angular bisector direction. Herein, supposing that the included angle between the light incidence direction and the normal is A, cos A=n·l. The cos A represents the light received on the surface of the object.

Supposing that the light comes from a point light source in the 3D spatial model, the energy radiated from the light is concentrated onto a spherical shell. With the transmission of the light, the spherical shell becomes increasingly larger, and the energy of a unit point on the spherical shell becomes increasingly smaller. It is defined that intensity of the light of the unit point on the spherical shell which is 1 away from the point light source is I, the intensity of the light of the unit point on the spherical shell which has a distance R is I/R. The I/R denotes how much light is transmitted to the object, and n·l denotes how much light is absorbed. Since the 3D spatial model is the reflection model, when the point multiplication result of the n·l is a negative number, no physical significance exists. Hence, the max(0, n·l) is used to indicate how much light is absorbed. After the reflection coefficient kd of the diffuse reflection is obtained, the diffusion reflection result may be obtained: Ld=kd(I/R)max(0, n·l).

Figure 8:
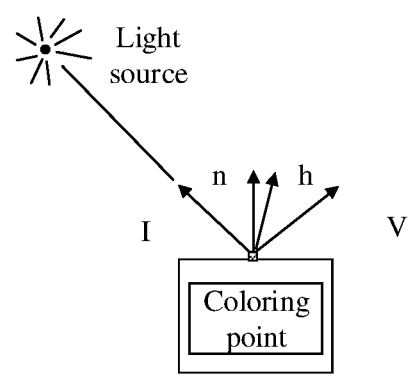
FIG. 8 is a second schematic diagram of light reflection in a 3D spatial model.

As illustrated in FIG. 8, when the observation direction gets close to the reflection direction in the 3D spatial model, the n, the I and the V are also close in the angular bisector direction. Herein, it is defined that the unit vector of the V in the angular bisector direction is h, and defined that both the n and the h have an angle of B, cosB=n·h. Since the 3D spatial model is the reflection model, the max(0,n·h) is used to indicate how much light is absorbed. In some embodiments of the present disclosure, considering that the angle change obviously affects the highlight effect, the max(0, n·h)p may be used to simulate the influence of the angle change on the highlight, and then the following may be obtained: Ls=ks(I/R)max(0,n·h)p. In the formula, the ks is the reflection coefficient of the highlight, and the p is the highlight coefficient.

In the 3D spatial model, supposing that the ambient light received at any point is the same, the La is a constant, i.e., La=kaIa. In the formula, the ka is the reflection coefficient of the ambient light, and the Ia is the intensity of the ambient light.

Therefore, based on the La, the Ld and the Ls, the lighting effect may be determined to simulate the corresponding lighting image.

Herein, different wallpapers displayed under the transparent lockscreen window are: images obtained when the same collection object is collected at different device orientations in the same light environment.

Since the device orientation of the electronic device changes when the electronic device collects a certain collection object, the amount of light entering a collection apparatus of the electronic device varies from each other, and this is also a case for the lighting effect of the displayed image. Then, by means of the wallpaper displayed under the lockscreen window, the user may see images for reflecting lighting differences at different device orientations.

In some embodiments of the disclosure, different wallpapers may be provided for different device orientations, such that the function of changing, according to the change of the device orientation of the electronic device, the wallpaper displayed in the lockscreen state for reflecting the lighting difference may be implemented.

It is to be noted that each lighting effect displayed by the collected object is obtained in combination with the highlight effect, the diffuse reflection effect and the ambient light effect, such that in the different wallpapers, at least one of the illumination region, the diffuse reflection region or the shadow region formed by the reflection when the collection object is imaged is different. The illumination region is the ambient light region, and the shadow region is represented by the highlight region.

The 3D spatial model including the electronic device may be pre-stored in the electronic device. When there is a need to reflect, through the wallpaper, the lighting differences of the images obtained by collecting the same collection object in the same illumination environment at different device orientations of the electronic device, the 3D spatial model may be projected according the relative position relationship between the 3D spatial model and the virtual viewpoint to generate the wallpaper, thereby implementing simulation of the images obtained by collecting the same collection object in the same illumination environment at different device orientations of the electronic device.

The virtual viewpoint refers to a collection device configured to collect the image in the 3D spatial model. Herein, when the orientation of the electronic device changes, the position of the collection device in the corresponding 3D spatial model changes correspondingly, so as to reflect the influence of the change of the orientation of the electronic device on the lighting effect of the collection object.

Take FIG. 6 as an example, the wallpaper displayed in the lockscreen state is the person model having different lighting effects corresponding to the different device orientations of the electronic device.

Therefore, in some embodiments of the present disclosure, through the change of the orientation of the electronic device, the differences of the lighting effects in the images by collecting the collection object may be embodied by showing the lockscreen wallpaper. In this way, the display of the lockscreen wallpaper may be enriched when the screen is locked, the lighting effects of the images obtained by collecting the same collection object in the same illumination environment at the different device orientations of the electronic device may also be displayed in combination with the device orientation and the 3D spatial model, thereby further enriching the function of the lockscreen wallpaper, and increasing the interestingness.

Figure 9:
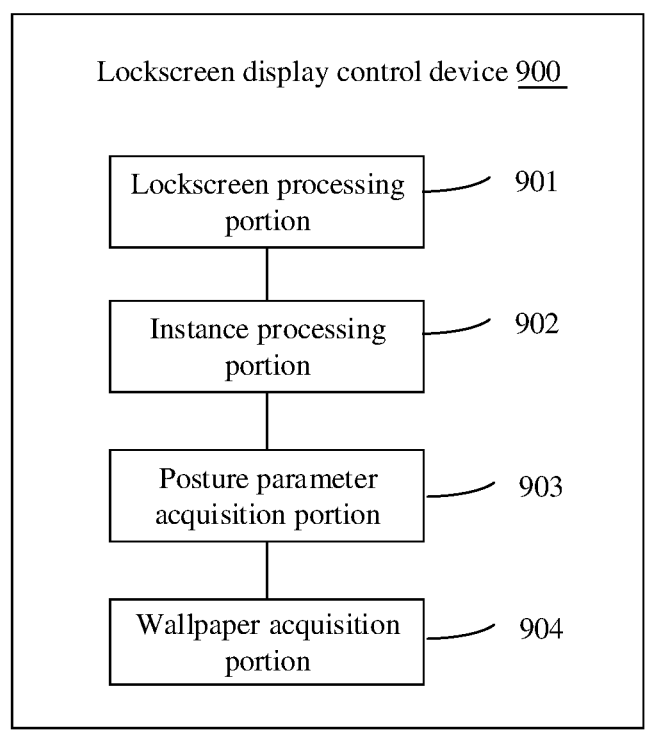
FIG. 9 is a structural schematic diagram of a lockscreen display control device according to some embodiments of the present disclosure.

In order to enrich the lockscreen wallpapers and improve the interactivity of the lockscreen wallpapers, some embodiments of the present disclosure further provide a lockscreen display control device. FIG. 9 is a structural schematic diagram of a lockscreen display control device according to some embodiments of the present disclosure. As illustrated in FIG. 9, the lockscreen display control device 900 may include: a lockscreen processing portion 901, an instance processing portion 902, an orientation parameter acquisition portion 903 and a wallpaper acquisition portion 904.

The lockscreen processing portion 901 is configured to draw, when an electronic device has a bright screen in a lockscreen state, a transparent lockscreen window by using a lockscreen service, and launch a lockscreen wallpaper process.

The instance processing portion 902 is configured to create an activity instance of the lockscreen wallpaper process, and set an attribute of the activity instance to be always on top.

The orientation parameter acquisition portion 903 is configured to monitor a device orientation of the electronic device by using the activity instance to acquire an orientation parameter.

The wallpaper acquisition portion 904 is configured to adjust a wallpaper displayed under the lockscreen window according to the orientation parameter, and control the wallpaper to dynamically display under the lockscreen window.

In some embodiments, the device may further include: a configuration portion.

The configuration portion is configured to configure, before the electronic device enters the lockscreen state, an application parameter of the lockscreen wallpaper process as a call parameter of a keyguard view mediator of the lockscreen service.

The lockscreen processing portion may further include: a lockscreen message receiving portion and a lockscreen processing subportion.

The lockscreen message receiving portion is configured to receive, when a display screen of the electronic device is turned on in the lockscreen state, a lockscreen message sent by a system process through the keyguard view mediator of the lockscreen service.

The lockscreen processing subportion is configured to control the keyguard view mediator of the lockscreen service to draw the transparent lockscreen window based on the lockscreen message, and launch the lockscreen wallpaper process according to the call parameter.

In some embodiments, the lockscreen processing subportion is further configured to call and launch the lockscreen wallpaper process through an intent according to an application identifier of the lockscreen wallpaper process in the call parameter.

In some embodiments, the instance processing module may include: an instance creation portion, a first instance instack portion, and an instance attribute setting portion.

The instance creation portion is configured to read, according to path information of a class where an activity of the lockscreen wallpaper process is located in the call parameter, a corresponding class of the activity, and create the activity instance according to the read class.

The first instance instack portion is configured to place, when determining that the activity instance is located in a stack according to a launch mode of the corresponding class of the activity, the activity instance of the lockscreen wallpaper process on a top of the stack.

The instance attribute setting portion is configured to set the attribute of the activity instance to be always on top.

In some embodiments, the device may further include: a second instance instack portion.

The second instance instack portion is configured to place, when the electronic device enters the lockscreen state and turns off the screen, an activity instance of an application program running before the screen is turned off on the top of the stack.

The first instance instack portion is specifically configured to move the activity instance of the application program running before the screen is turned off to a tail of the stack, and push the activity instance of the lockscreen wallpaper process onto the top of the stack.

The device may further include: a lockscreen unlocking portion.

The lockscreen unlocking portion is configured to, after the lockscreen state is removed, end the lockscreen wallpaper process, move the activity instance of the lockscreen wallpaper process out of the stack, restore the activity instance of the application program running before the screen is turned off to the top of the stack.

In some embodiments, the wallpaper acquisition portion may include: a selection portion, configured to select, according to the orientation parameter, the wallpaper displayed under the lockscreen window from multiple alternative images corresponding to different device orientations; or a projection portion, configured to acquire a 3D spatial model including the electronic device, and project the 3D spatial model according to the orientation parameter and a relative position relationship between the 3D spatial model and a virtual viewpoint to generate the wallpaper displayed under the lockscreen window.

In some embodiments, different wallpapers displayed under the transparent lockscreen window are images obtained when a same collection object is collected at different device orientations in same light environment.

In some embodiments, in the different wallpapers, at least one of an illumination region, a diffuse reflection region or a shadow region formed by reflection when the collection object is imaged is different.

For the device in the above embodiments, the specific manner for the operation executed by each portion has been described in detail in some embodiments related to the method, and is not repeated herein.

Figure 10:
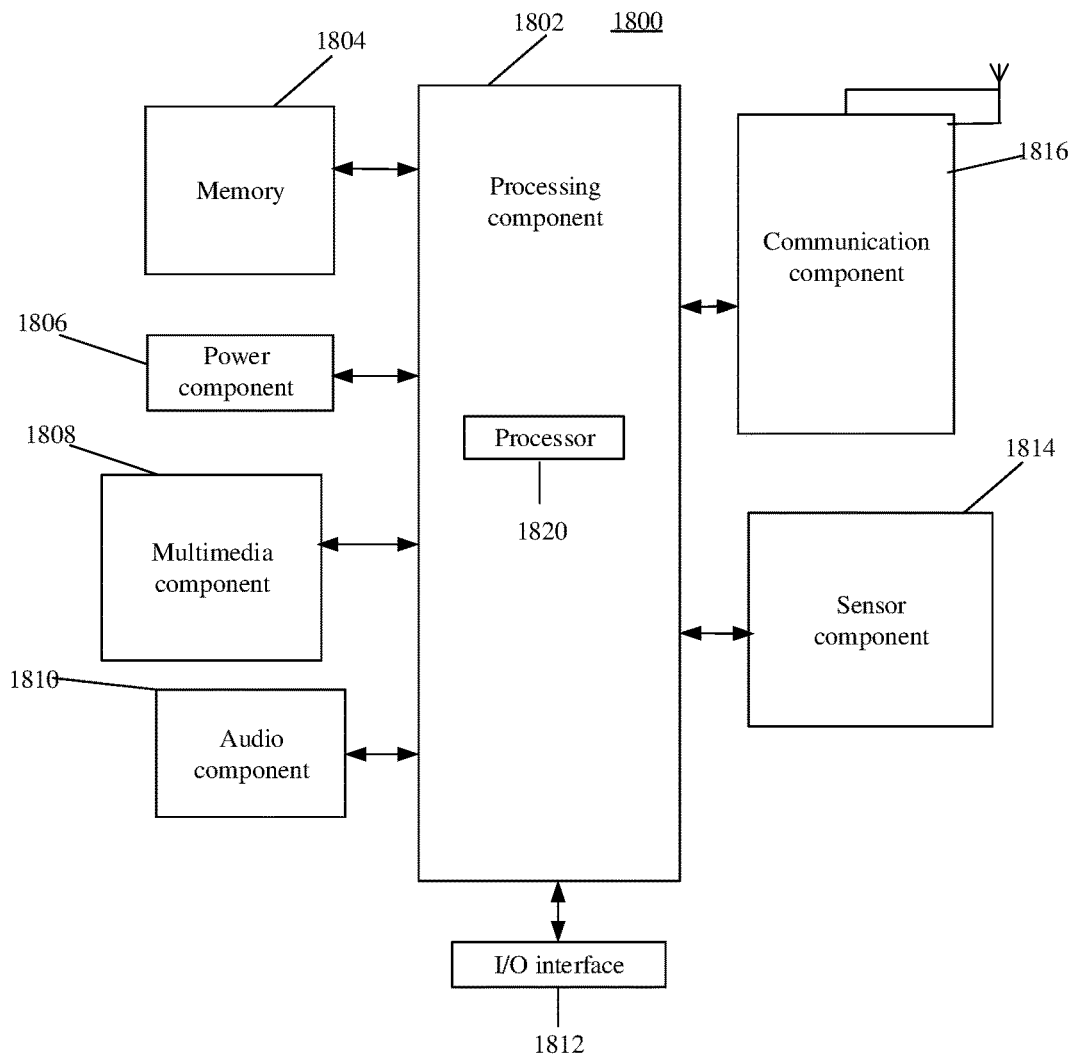
FIG. 10 is a block diagram of a lockscreen display control device according to some embodiments of the present disclosure.

FIG. 10 is a block diagram of a lockscreen display control device 1800 according to some embodiments of the present disclosure. For example, the device 1800 may be a mobile phone, a computer, a digital broadcast terminal, a messaging device, a gaming console, a tablet, a medical device, exercise equipment, a personal digital assistant, and the like.

Referring to FIG. 10, the device 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 typically controls overall operations of the device 1800, such as the operations associated with display, telephone calls, data communications, camera operations, and recording operations. The processing component 1802 may include one or more processors 1820 to execute instructions to perform all or part of the steps in the above described methods. Moreover, the processing component 1802 may include one or more modules which facilitate interaction between the processing component 1802 and other components. For instance, the processing component 1802 may include a multimedia module to facilitate interaction between the multimedia component 1808 and the processing component 1802.

The memory 1804 is configured to store various types of data to support the operation of the device 1800. Examples of such data include instructions for any applications or methods operated on the device 1800, contact data, phonebook data, messages, pictures, video, etc. The memory 1804 may be implemented by any type of volatile or non-volatile memory devices, or a combination thereof, such as an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1806 provides power for various components of the device 1800. The power component 1806 may include a power management system, one or more power supplies, and other components associated with generation, management and distribution of power for the device 1800.

The multimedia component 1808 includes a screen providing an output interface between the device 1800 and a user. In some embodiments, the screen may include a liquid crystal display (LCD) and a touch panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1808 includes a front camera and/or a rear camera. The front camera and/or the rear camera may receive external multimedia data when the device 1800 is in an operation mode, such as a photographing mode or a video mode. Each of the front camera and the rear camera may be a fixed optical lens system or have focusing and optical zooming capabilities.

The audio component 1810 is configured to output and/or input an audio signal. For example, the audio component 1810 includes a microphone (MIC) configured to receive an external audio signal when the device 1800 is in an operation mode, such as a call mode, a recording mode and a voice recognition mode. The received audio signal may further be stored in the memory 1804 or sent via the communication component 1816. In some embodiments, the audio component 1810 further includes a speaker configured to output the audio signal.

The I/O interface 1812 provides an interface between the processing component 1802 and peripheral interface modules, such as a keyboard, a click wheel, buttons and the like. The buttons may include, but are not limited to, a home button, a volume button, a starting button and a locking button.

The sensor component 1814 includes one or more sensors configured to provide status assessments in various aspects for the device 1800. For instance, the sensor component 1814 may detect an on/off status of the device 1800 and relative positioning of components, such as a display and small keyboard of the device 1800, and the sensor component 1814 may further detect a change in a position of the device 1800 or a component of the device 1800, presence or absence of contact between the user and the device 1800, orientation or acceleration/deceleration of the device 1800 and a change in temperature of the device 1800. The sensor component 1814 may include a proximity sensor configured to detect presence of an object nearby without any physical contact. The sensor component 1814 may also include a light sensor, such as a complementary metal oxide semiconductor (CMOS) or charge coupled device (CCD) image sensor, configured for use in an imaging application. In some embodiments, the sensor component 1814 may also include an acceleration sensor, a gyroscope sensor, a magnetic sensor, a pressure sensor or a temperature sensor.

The communication component 1816 is configured to facilitate wired or wireless communication between the device 1800 and other devices. The device 1800 may access a communication-standard-based wireless network, such as a wireless fidelity (Wi-Fi) network, a 2nd-generation (2G), 3rd-generation (3G), 4G, or 5G network or a combination thereof. In some embodiments of the present disclosure, the communication component 1816 receives a broadcast signal or broadcast associated information from an external broadcast management system via a broadcast channel In some embodiments of the present disclosure, the communication component 1816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In some embodiments of the present disclosure, the device 1800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the above described methods.

In some embodiments of the present disclosure, there is also provided a non-transitory computer-readable storage medium including instructions, such as included in the memory 1804, executable by the processing component 1820 of the device 1800 for performing the above methods. For example, the non-transitory computer-readable storage medium may be a ROM, a random-access memory (RAM), a compact disc read-only memory (CD-ROM), a magnetic tape, a floppy disc, an optical data storage device, and the like.

A non-transitory computer-readable storage medium is provided, instructions in the storage medium are executed by a processor of a lockscreen display control device, to cause the lockscreen display control device to execute the lockscreen display control method in the above embodiments.

The various device components, modules, units, blocks, or portions may have modular configurations, or are composed of discrete components, but nonetheless can be referred to as "modules" or "portions" etc. in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A lockscreen display control method, applied to an electronic device, the method comprising:
    drawing, responsive to that the electronic device has a bright screen in a lockscreen state, a transparent lockscreen window by using a lockscreen service, and launching a lockscreen wallpaper process;
    creating an activity instance of the lockscreen wallpaper process, and setting an attribute of the activity instance to be always on top;
    monitoring a device orientation of the electronic device by using the activity instance to acquire an orientation parameter;
    adjusting, according to the orientation parameter, a wallpaper displayed under the lockscreen window, and controlling the wallpaper to dynamically display under the lockscreen window; and
    configuring, before the electronic device enters the lockscreen state, an application parameter of the lockscreen wallpaper process as a call parameter of a keyguard view mediator of the lockscreen service;
    wherein the creating the activity instance of the lockscreen wallpaper process, and setting the attribute of the activity instance to be always on top comprise: reading, according to path information of a class where an activity of the lockscreen wallpaper process is located in the call parameter, a corresponding class of the activity, and creating the activity instance according to the read class; placing, responsive to determining that the activity instance is located in a stack according to a launch mode of the corresponding class of the activity, the activity instance of the lockscreen wallpaper process on a top of the stack; and setting the attribute of the activity instance to be always on top;
    the method further comprising: placing, responsive to that the electronic device enters the lockscreen state and turns off the screen, an activity instance of an application program running before the screen is turned off on the top of the stack;
    wherein placing the activity instance of the lockscreen wallpaper process on the top of the stack comprises: moving the activity instance of the application program running before the screen is turned off to a tail of the stack, and pushing the activity instance of the lockscreen wallpaper process onto the top of the stack; and
    wherein the method further comprises: ending, after the lockscreen state is removed, the lockscreen wallpaper process, moving the activity instance of the lockscreen wallpaper process out of the stack, and restoring the activity instance of the application program running before the screen is turned off to the top of the stack.

2. The method of claim 1,
    wherein the drawing, responsive to that the electronic device has the bright screen in the lockscreen state, the transparent lockscreen window by using the lockscreen service, and launching the lockscreen wallpaper process comprise:
    receiving, responsive to that a display screen of the electronic device is turned on in the lockscreen state, a lockscreen message sent by a system process through the keyguard view mediator of the lockscreen service; and
    drawing the transparent lockscreen window through the keyguard view mediator of the lockscreen service based on the lockscreen message, and launching the lockscreen wallpaper process according to the call parameter.

3. The method of claim 2, wherein the launching the lockscreen wallpaper process according to the call parameter comprises:
    calling and launching the lockscreen wallpaper process through an intent according to an application identifier of the lockscreen wallpaper process in the call parameter.

4. The method of claim 1, wherein the adjusting the wallpaper displayed under the lockscreen window according to the orientation parameter comprises:
    selecting, according to the orientation parameter, the wallpaper displayed under the lockscreen window from multiple alternative images corresponding to different device orientations; or,
    acquiring a three-dimensional (3D) spatial model including the electronic device, and projecting the 3D spatial model according to the orientation parameter and a relative position relationship between the 3D spatial model and a virtual viewpoint to generate the wallpaper displayed under the lockscreen window.

5. The method of claim 1, wherein different wallpapers displayed under the transparent lockscreen window are images obtained responsive to that a same collection object is collected at different device orientations in same light environment.

6. The method of claim 5, wherein in the different wallpapers, at least one of an illumination region, a diffuse reflection region or a shadow region formed by reflection responsive to that the collection object is imaged is different.

7. A mobile terminal implementing the method of claim 1, comprising:
    a display screen; and
    an orientation sensor configured to measure an orientation of the mobile terminal, wherein the mobile terminal is configured to:
select a wallpaper to be displayed by monitoring the orientation of the mobile terminal with the orientation sensor, such that the wallpaper displayed in the lockscreen state changes according to the change of the device orientation, thereby realizing flexible interactivity of the wallpaper;
reduce influences from activities of other application programs by setting the attribute of the activity instance of the lockscreen wallpaper process to be always on top, such that the activity instance of the lockscreen wallpaper process is always on top of the stack when the mobile has the bright screen in the lockscreen state, thereby ensuring that device state of the mobile terminal is monitored continuously;
wherein different wallpapers are configured to simulate different images obtained by collecting a same collection object under same illumination environment at different orientations of the mobile terminal;
wherein the collection object is a 3D spatial model downloaded, constructed or stored in the mobile phone, and based on reflection of light rays in at least one of a Phong illumination model and a blinn-phong based illumination model, having a highlight region, a diffuse reflection region, and an ambient light region;
wherein the mobile terminal is configured to construct each lighting effect (L) shown by the collection object in combination with a highlight effect (La), a diffuse reflection effect (Ld) and an ambient light effect (Ls); wherein L=La+Ld+Ls;
wherein a point where the light rays are irradiated onto the surface of the object in the 3D spatial model is denoted as a coloring point, n is a normal perpendicular to the surface of the object, I denotes a vector in a light incidence direction, and V is a vector in an observation direction of an observer, when the observation direction is adjacent to a specular reflection direction, highlight is observable; when the observation direction is adjacent to the reflection direction, the n, the I and the V are also adjacent in an angular bisector direction; for an included angle between the light incidence direction and the normal A, cos A=n·I, cos A represents the light received on the surface of the object; and
the mobile terminal is configured to calculate:

$Ld=kd(I/R)\max(0,n·l)$;

Ls=ks(I/R)max(0, n·h)p, where ks is the reflection coefficient of the highlight, and the p is the highlight coefficient; and
La=kaIa, where ka is the reflection coefficient of the ambient light, and Ia is the intensity of the ambient light.

8. A lockscreen display control device, comprising:
a processor; and
memory for storing instructions executable by the processor;
wherein the processor is configured to:
draw, responsive to that an electronic device has a bright screen in a lockscreen state, a transparent lockscreen window by using a lockscreen service, and launch a lockscreen wallpaper process;
create an activity instance of the lockscreen wallpaper process, and set an attribute of the activity instance to be always on top;
monitor a device orientation of the electronic device by using the activity instance to acquire an orientation parameter;
adjust, according to the orientation parameter, a wallpaper displayed under the lockscreen window, and control the wallpaper to dynamically display under the lockscreen window;
configure, before the electronic device enters the lockscreen state, an application parameter of the lockscreen wallpaper process as a call parameter of a keyguard view mediator of the lockscreen service;
read, according to path information of a class where an activity of the lockscreen wallpaper process is located in the call parameter, a corresponding class of the activity, and create the activity instance according to the read class;
place, responsive to determining that the activity instance is located in a stack according to a launch mode of the corresponding class of the activity, the activity instance of the lockscreen wallpaper process on a top of the stack;
set the attribute of the activity instance to be always on top;
place, responsive to that the electronic device enters the lockscreen state and turns off the screen, an activity instance of an application program running before the screen is turned off on the top of the stack;
move the activity instance of the application program running before the screen is turned off to a tail of the stack, and push the activity instance of the lockscreen wallpaper process onto the top of the stack; and
end, after the lockscreen state is removed, the lockscreen wallpaper process, move the activity instance of the lockscreen wallpaper process out of the stack, and restore the activity instance of the application program running before the screen is turned off to the top of the stack.

9. The device of claim 8, wherein the processor is further configured to:
receive, responsive to that a display screen of the electronic device is turned on in the lockscreen state, a lockscreen message sent by a system process through the keyguard view mediator of the lockscreen service; and
control the keyguard view mediator of the lockscreen service to draw the transparent lockscreen window based on the lockscreen message, and launch the lockscreen wallpaper process according to the call parameter.

10. The device of claim 9, wherein the processor is further configured to call and launch the lockscreen wallpaper process through an intent according to an application identifier of the lockscreen wallpaper process in the call parameter.

11. The device of claim 8, wherein the processor is further configured to:
select, according to the orientation parameter, the wallpaper displayed under the lockscreen window from multiple alternative images corresponding to different device orientations; or
acquire a three-dimensional (3D) spatial model including the electronic device, and project the 3D spatial model according to the orientation parameter and a relative position relationship between the 3D spatial model and a virtual viewpoint to generate the wallpaper displayed under the lockscreen window.

12. The device of claim 8, wherein different wallpapers displayed under the transparent lockscreen window are images obtained responsive to that a same collection object is collected at different device orientations in same light environment.

13. The device of claim 12, wherein in the different wallpapers, at least one of an illumination region, a diffuse reflection region or a shadow region formed by reflection responsive to that the collection object is imaged is different.

14. A non-transitory computer-readable storage medium, wherein instructions in the storage medium are executed by a processor of a lockscreen display control device, to cause the lockscreen display control device to execute a lockscreen display control method, applied to an electronic device, the method comprising:
- drawing, responsive to that the electronic device has a bright screen in a lockscreen state, a transparent lockscreen window by using a lockscreen service, and launching a lockscreen wallpaper process;
- creating an activity instance of the lockscreen wallpaper process, and setting an attribute of the activity instance to be always on top;
- monitoring a device orientation of the electronic device by using the activity instance to acquire an orientation parameter;
- adjusting, according to the orientation parameter, a wallpaper displayed under the lockscreen window, and controlling the wallpaper to dynamically display under the lockscreen window;
- configuring, before the electronic device enters the lockscreen state, an application parameter of the lockscreen wallpaper process as a call parameter of a keyguard view mediator of the lockscreen service;
- wherein the creating the activity instance of the lockscreen wallpaper process, and setting the attribute of the activity instance to be always on top comprise:
- reading, according to path information of a class where an activity of the lockscreen wallpaper process is located in the call parameter, a corresponding class of the activity, and creating the activity instance according to the read class; placing, responsive to determining that the activity instance is located in a stack according to a launch mode of the corresponding class of the activity, the activity instance of the lockscreen wallpaper process on a top of the stack; and setting the attribute of the activity instance to be always on top;

the method further comprising: placing, responsive to that the electronic device enters the lockscreen state and turns off the screen, an activity instance of an application program running before the screen is turned off on the top of the stack;
- wherein placing the activity instance of the lockscreen wallpaper process on the top of the stack comprises: moving the activity instance of the application program running before the screen is turned off to a tail of the stack, and pushing the activity instance of the lockscreen wallpaper process onto the top of the stack; and
- wherein the method further comprises: ending, after the lockscreen state is removed, the lockscreen wallpaper process, moving the activity instance of the lockscreen wallpaper process out of the stack, and restoring the activity instance of the application program running before the screen is turned off to the top of the stack.

15. The non-transitory computer-readable storage medium of claim 14,
- wherein the drawing, responsive to that the electronic device has the bright screen in the lockscreen state, the transparent lockscreen window by using the lockscreen service, and launching the lockscreen wallpaper process comprise:
- receiving, responsive to that a display screen of the electronic device is turned on in the lockscreen state, a lockscreen message sent by a system process through the keyguard view mediator of the lockscreen service; and
- drawing the transparent lockscreen window through the keyguard view mediator of the lockscreen service based on the lockscreen message, and launching the lockscreen wallpaper process according to the call parameter.

16. The non-transitory computer-readable storage medium of claim 15, wherein the launching the lockscreen wallpaper process according to the call parameter comprises:
- calling and launching the lockscreen wallpaper process through an intent according to an application identifier of the lockscreen wallpaper process in the call parameter.

* * * * *